United States Patent
Kusuno

(10) Patent No.: US 8,223,089 B2
(45) Date of Patent: Jul. 17, 2012

(54) IMAGE DISPLAY APPARATUS THAT ALLOWS VIEWING OF THREE-DIMENSIONAL IMAGE FROM DIRECTIONS

(75) Inventor: Tetsuya Kusuno, Iruma (JP)

(73) Assignee: Casio Computer Co., Ltd., Tokyo (JP)

( * ) Notice: Subject to any disclaimer, the term of this patent is extended or adjusted under 35 U.S.C. 154(b) by 302 days.

(21) Appl. No.: 12/731,517

(22) Filed: Mar. 25, 2010

(65) Prior Publication Data

US 2010/0177170 A1 Jul. 15, 2010

Related U.S. Application Data

(63) Continuation of application No. 11/729,649, filed on Mar. 29, 2007, now Pat. No. 7,724,209.

(30) Foreign Application Priority Data

Mar. 31, 2006 (JP) .................................. 2006-100261

(51) Int. Cl.
*G09G 3/00* (2006.01)
*G09G 5/00* (2006.01)

(52) U.S. Cl. .............................................. 345/32; 345/6
(58) Field of Classification Search ............... 345/1.1–6, 345/32, 87–104, 204–215, 690–699; 359/462–477; 349/15; 348/40–60
See application file for complete search history.

(56) References Cited

U.S. PATENT DOCUMENTS

| 5,264,964 A * | 11/1993 | Faris ............................. 359/465 |
| 5,493,427 A | 2/1996 | Nomura et al. |
| 5,875,055 A | 2/1999 | Morishima et al. |
| 5,969,850 A | 10/1999 | Harrold et al. |
| 5,991,074 A | 11/1999 | Nose et al. |
| 6,046,849 A | 4/2000 | Moseley et al. |
| 6,049,424 A | 4/2000 | Hamagishi |
| 6,094,216 A | 7/2000 | Taniguchi et al. |
| 7,139,042 B2 | 11/2006 | Nam et al. |
| 7,148,862 B2 | 12/2006 | Morishima et al. |
| 7,190,518 B1 * | 3/2007 | Kleinberger et al. ......... 359/465 |
| 7,609,445 B2 * | 10/2009 | Hamagishi .................... 359/463 |
| 2002/0001128 A1 | 1/2002 | Moseley et al. |
| 2007/0058127 A1 * | 3/2007 | Mather et al. ................. 349/159 |
| 2007/0165305 A1 * | 7/2007 | Mehrle ......................... 359/464 |

FOREIGN PATENT DOCUMENTS

| JP | 3-119889 A | 5/1991 |
| JP | 7-5455 A | 1/1995 |
| JP | 10-268230 A | 10/1998 |

* cited by examiner

*Primary Examiner* — Alexander Eisen
*Assistant Examiner* — Patrick F Marinelli
(74) *Attorney, Agent, or Firm* — Holtz, Holtz, Goodman & Chick P.C.

(57) ABSTRACT

An image display apparatus includes an image display device having pixels to display right- and left-eye images for a three-dimensional image, a first and second optical shutter devices located on rear and front sides of the image display device. The pixels include pixel pairs that have pixels arranged across first light-shielding portions and that are arrayed across second light-shielding portions. The first shutter device includes first light-transmitting portions that cause image light beams passing through the pixels to strike the right and left eyes of a viewer located in a first direction, and first shutter portions to control transmission/shielding of light. The second shutter device includes second light-transmitting portions that cause image light beams passing through the pixels to strike right eyes and left eyes of viewers located in second and third directions, and second shutter portions to control transmission/shielding of light.

20 Claims, 6 Drawing Sheets

IMAGE DISPLAY APPARATUS THAT ALLOWS VIEWING OF THREE-DIMENSIONAL IMAGE FROM DIRECTIONS

CROSS-REFERENCE TO RELATED APPLICATIONS

The present application is a Continuation application of U.S. application Ser. No. 11/729,649 filed Mar. 29, 2007 now U.S. Pat. No. 7,724,209, which is based upon and claims the benefit of priority from prior Japanese Patent Application No. 2006-100261, filed Mar. 31, 2006, the entire contents of both of which are incorporated herein by reference.

BACKGROUND OF THE INVENTION

1. Field of the Invention

The present invention relates to an image display apparatus that allows viewing of a stereoscopic three-dimensional image.

2. Description of the Related Art

A conventional display apparatus that displays a three-dimensional image is configured to display a left-eye image by using the respective pixels on alternate pixel arrays of the pixel arrays parallel to the vertical direction of the screen of an image display device such as a liquid crystal display device and display a right-eye image by using the respective pixels on the other alternate pixel arrays, thereby allowing the left and right eyes of a viewer to view the left- and right-eye images, respectively. As means for allowing the right and left eyes of the viewer to view the left- and right-eye images, there are known a lenticular lens (Jpn. Pat. Appln. KOKAI Publication No. 7-005455), which distributes and irradiates the left- and right-eye images in the left-eye direction and right-eye direction of the viewer, and a parallax barrier (see Jpn. Pat. Appln. KOKAI Publication No. 3-119889 and 10-268230), which is formed in a striped pattern by alternately arranging light-transmitting portions and light-shielding portions parallel to the pixel arrays.

A conventional three-dimensional image display apparatus allows to only view a three-dimensional image from a predetermined viewing direction, e.g., a normal direction passing through the central portion of the screen of the image display device in the horizontal direction.

BRIEF SUMMARY OF THE INVENTION

An image display apparatus according to an aspect of the present invention comprises an image display device including pixels to display a right-eye image and a left-eye image for displaying a three-dimensional image, the pixels including pixel pairs that have pixels arranged to be adjacent across first light-shielding portions, the pixel pairs being arrayed across second light-shielding portions, a first optical shutter device that is placed on a rear side of the image display device, which is opposite to a viewing side thereof, and includes first light-transmitting portions that are placed at positions corresponding to the first light-shielding portions of the image display device, transmit light toward the pixel pairs of the image display device, and cause image light beams passing through the pixels of the pixel pairs to strike a right eye and a left eye of a viewer located in a predetermined first viewing direction, and first shutter portions to control transmission/shielding of light with respect to an area other than the first light-transmitting portions, and a second optical shutter device that is placed on a front side of the viewing side of the image display device, and includes second light-transmitting portions that are placed at positions corresponding to the second light-shielding portions of the image display device, and cause image light beams respectively passing through the pixels of the pixel pairs that are adjacent to each other across the second light-shielding portions to strike right eyes and left eyes of viewers located in a predetermined second viewing direction and a third viewing direction different from the second viewing direction, and second shutter portions to control transmission/shielding of light with respect to an area other than the second light-transmitting portions.

An image display apparatus according to another aspect of the present invention comprises an image display device including pixels to display a right-eye image and a left-eye image for displaying a three-dimensional image, the pixels including pixel pairs that have pixels arranged to be adjacent across first light-shielding portions, the pixel pairs being arrayed across second light-shielding portions, a surface light source that is placed on a rear side of the image display device, which is opposite to a viewing side, and irradiates illumination light to the image display device, a first optical shutter device that is placed between the image display device and the surface light source, and includes first light-transmitting portions that are placed at positions corresponding to the first light-shielding portions of the image display device, irradiate illumination light from the surface light source toward the pixel pairs of the image display device, and cause image light beams passing through the respective pixels of the pixel pairs to strike a right eye and a left eye of a viewer located in a predetermined first viewing direction, and first shutter portions to control transmission/shielding of light with respect to an area other than the first light-transmitting portions, and a second optical shutter that is placed on a front side of the image display device, which is opposite to the surface light source, and includes second light-transmitting portions that are placed at positions corresponding to the second light-shielding portions of the image display device, and cause image light beams of illumination light from the surface light source that have passed through the respective pixels of the pixel pairs adjacent to the second light-shielding portions of the image display device to strike right eyes and left eyes of viewers located in a predetermined second viewing direction and a third viewing direction different from the second viewing direction, and second shutter portions to control transmission/shielding of light with respect to an area other than the second light-transmitting portions.

A three-dimensional image display apparatus according to still another aspect of the present invention comprises an image display device that includes first non-display portions that are almost black and in the form of strips parallel to a vertical direction of a screen, second non-display portions that are almost black and in the form of strips with a width larger than that of the first non-display portions, the first and second non-display portions being alternately formed at predetermined intervals in a predetermined screen area in a horizontal direction of the screen, and image display portions including pixels for controlling transmission of light in accordance with image data upon writing of the image data, the pixels being arrayed in the respective areas between the first and second non-display portions in the screen area, a first optical shutter device that is placed on an opposite side to a viewing side of the image display device, and includes first light-transmitting portions that steadily transmit light and are formed in areas corresponding to the first non-display portions of the image display device, as viewed from a predetermined viewing direction of the image display device, and shutter portions that control transmission/shielding of light in accordance with selective supply of first shutter opening signals and shutter closing signals and are formed in other areas, a second optical shutter device that is placed on the viewing side of the image display device, and includes second light-transmitting portions that steadily transmit light and are formed in areas corresponding to middle portions of the second non-display portions of the image display device, as viewed from the viewing direction, and shutter portions that control transmission/shielding of light in accordance with selective supply of second shutter opening signals and shutter closing signals and are formed in other areas, a surface light source that is placed on an opposite side of the first optical shutter device to a side facing the image display device, and applies illumination light toward the first optical shutter device, and a driver that selectively performs a first display drive mode of writing left-eye image data of left-eye image data and right-eye image data for display of a three-dimensional image in pixels of image display portions, of the adjacent image display portions located across the first non-display portion of the image display device, that are located on a left side of the first non-display portions, as viewed from the viewing direction, writing right-eye image data in pixels of the image display portions that are located on a right side of the first non-display portions, supplying the first shutter closing signal for shielding light to the shutter portions of the first optical shutter device, and supplying the second shutter opening signal for transmitting light to the shutter portions of the second optical shutter device, and a second display drive mode of writing the left-eye image data in the pixels of image display portions, of the adjacent image display portions located across the second non-display portion of the image display device, that are located on the left side of the second non-display portions, as viewed from the viewing direction, writing the right-eye image data in the pixels of the image display portions that are located on the right side of the second non-display portions, supplying the first shutter opening signal for transmitting light to the shutter portions of the first optical shutter device, and supplying the second shutter closing signal for shielding light to the shutter portions of the second optical shutter device.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
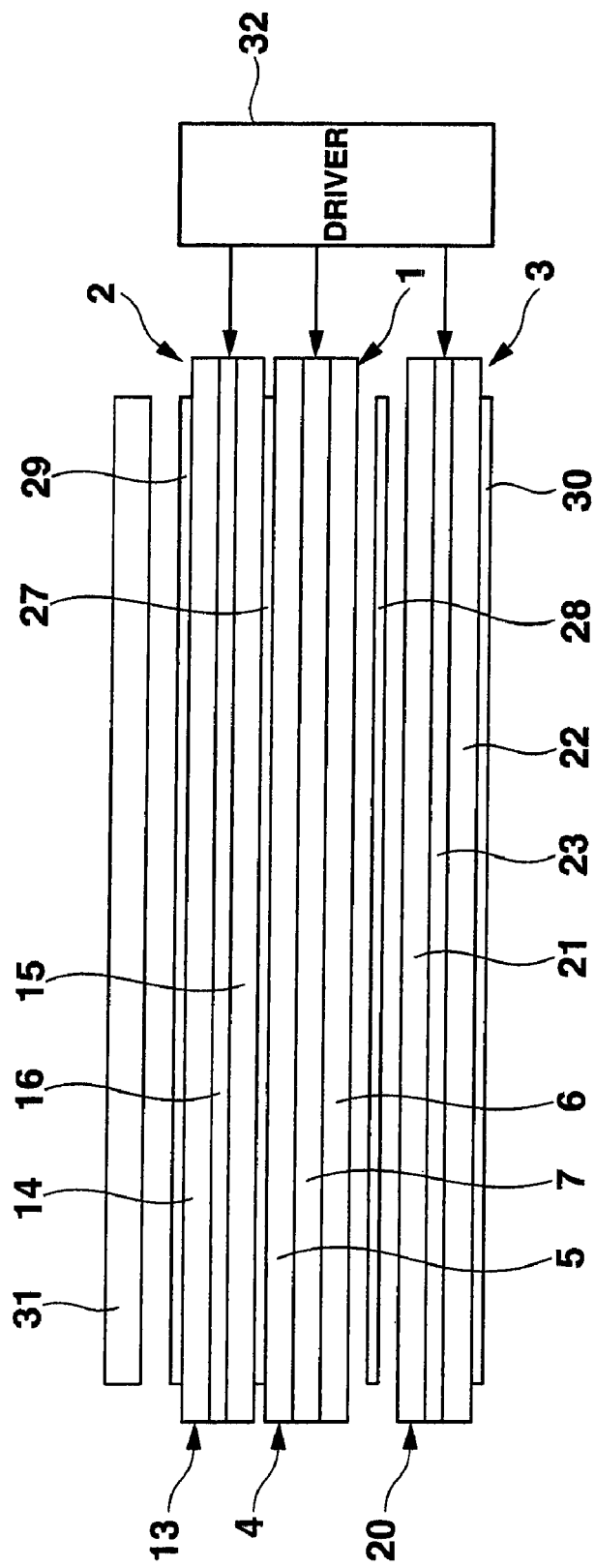
FIG. 1 is a side view of an image display apparatus according to an embodiment of the present invention.
Figure 2:
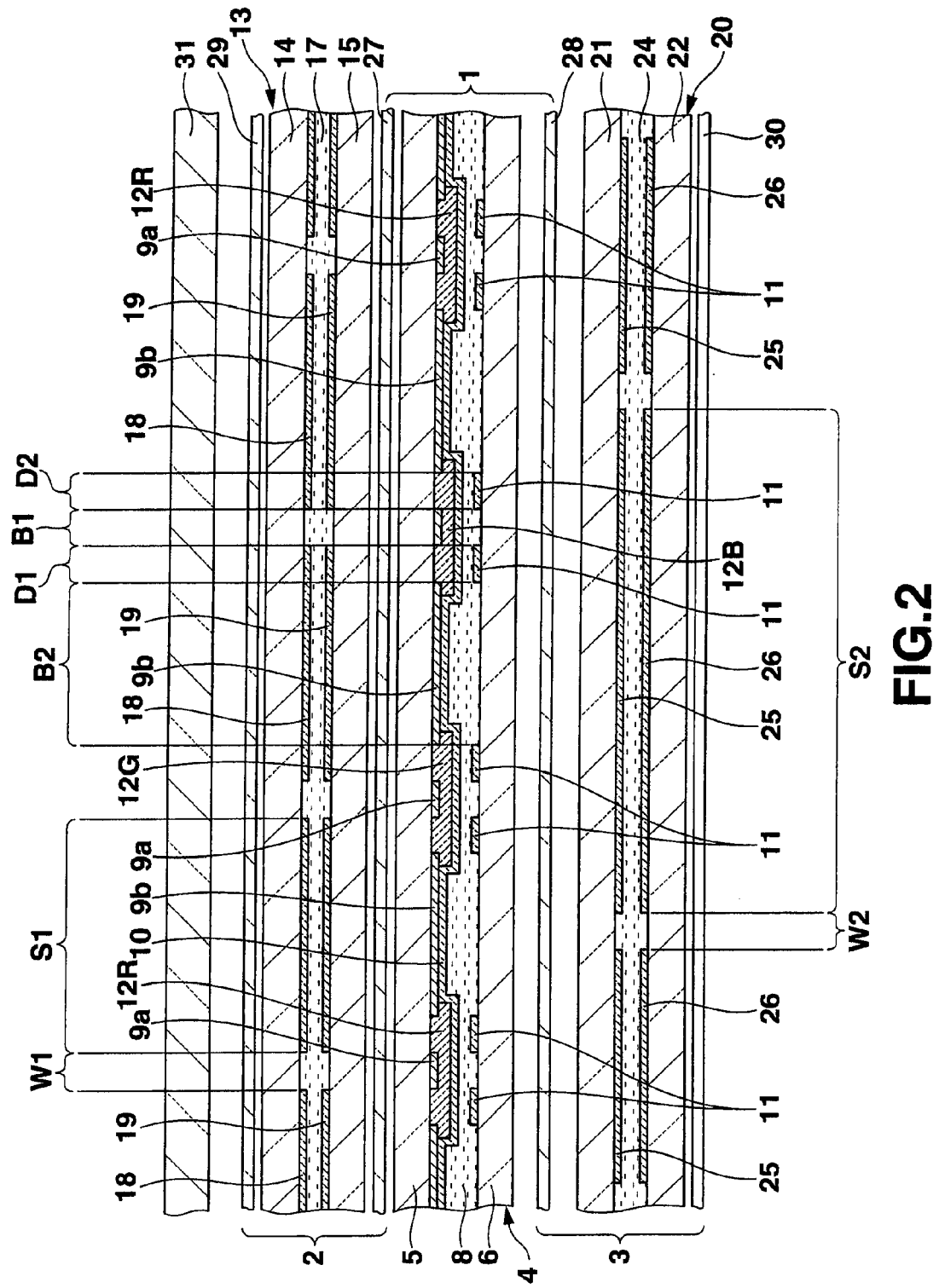
FIG. 2 is an enlarged sectional view of part of the display apparatus.
Figure 3:
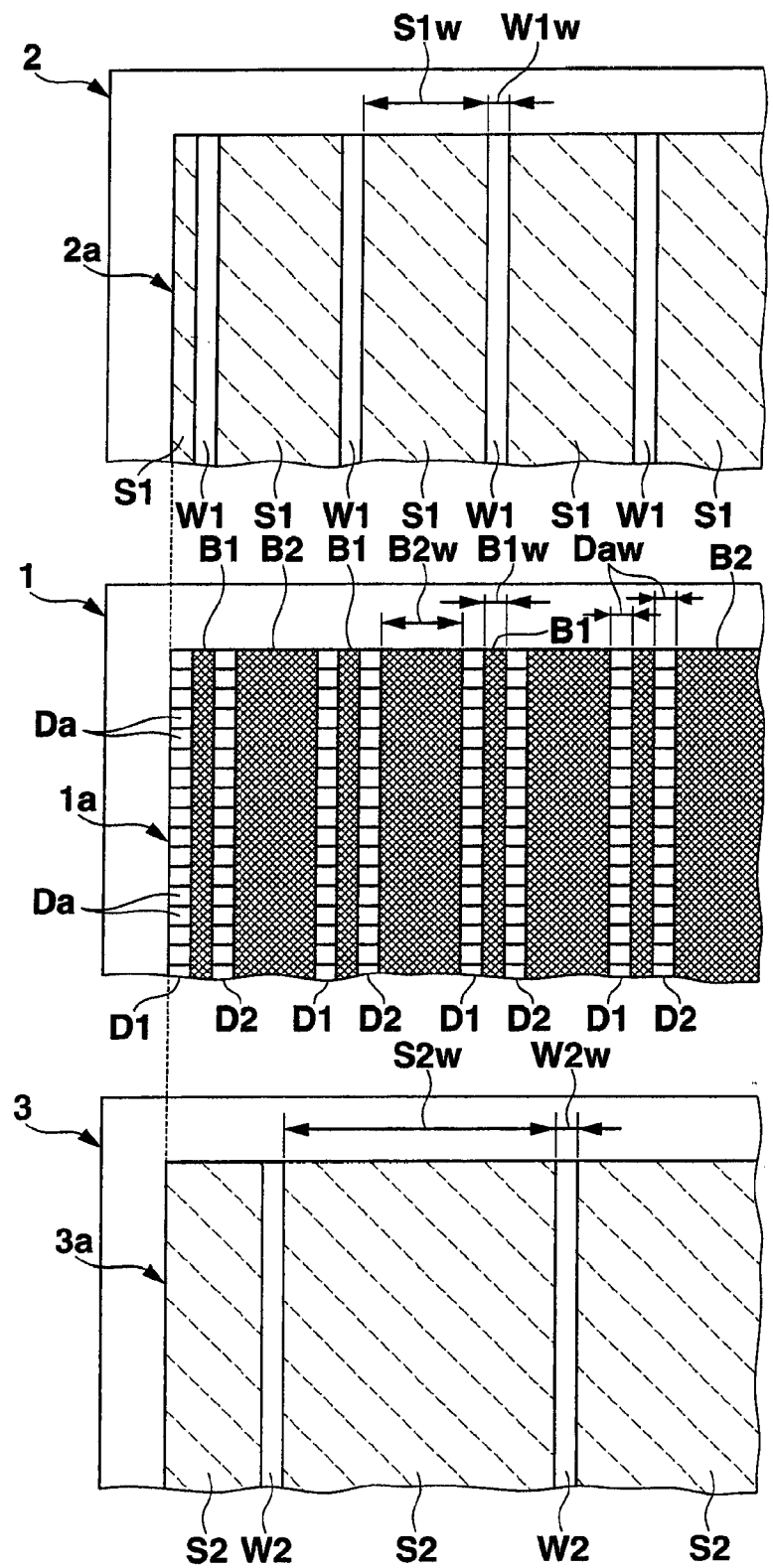
FIG. 3 is a front view showing part of an image display device and first and second optical shutter devices, which constitute the display apparatus.
Figure 4:
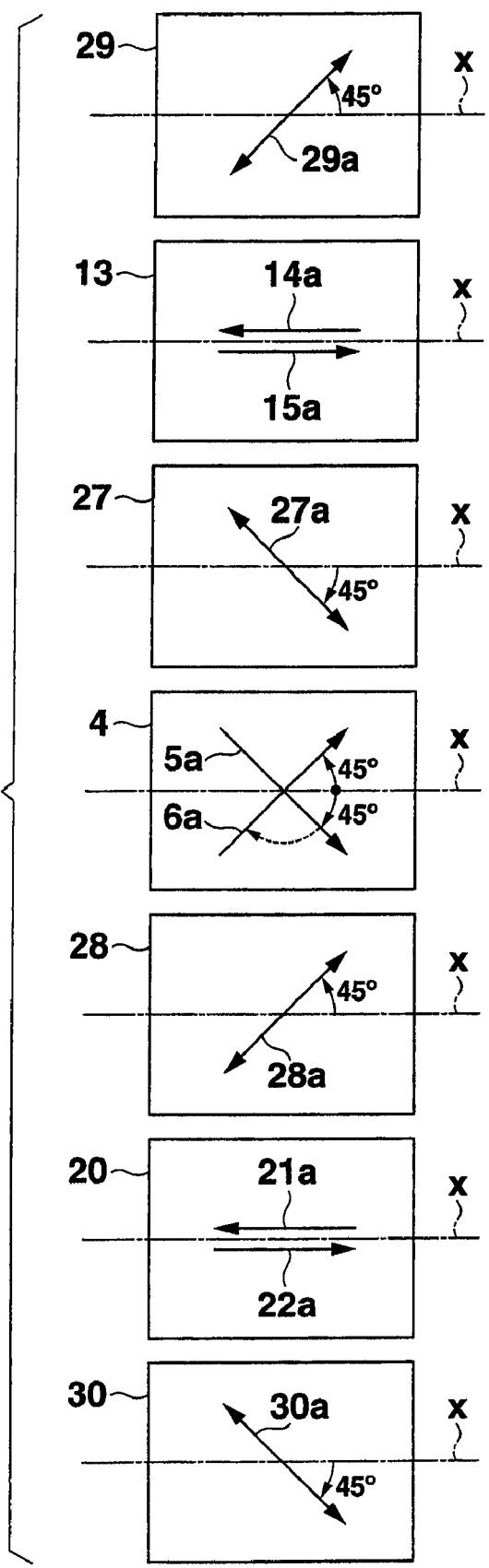
FIG. 4 is a view showing aligning treatment directions on the inner surfaces of a pair of substrates of liquid crystal cells and the transmission axes of polarizing plates, which constitute the image display device and the first and second optical shutter devices.

FIGS. 1 to 6 show an embodiment of the present invention. FIG. 1 is a side view of a three-dimensional image display apparatus. FIG. 2 is an enlarged sectional view of part of the display apparatus in FIG. 2. FIG. 3 is a front view showing part of an image display device and first and second optical shutter devices, which constitute the display apparatus. FIG. 4 is a view showing aligning treatment directions on the inner surfaces of a pair of substrates of liquid crystal cells and the transmission axes of polarizing plates, which constitute the image display device and the first and second optical shutter devices.

As shown in FIGS. 1 and 2, this three-dimensional image display apparatus includes an image display device 1 having a predetermined rectangular screen area 1a (see FIG. 3), a first optical shutter device 2 that is placed on the opposite side of the image display device 1 to the viewing side (the lower side in FIGS. 1 and 2), a second optical shutter device 3 that is placed on the viewing side of the image display device 1, a surface light source 31 that is placed on the opposite side of the first optical shutter device 2 to the side facing the image display device 1, and applies illumination light toward the first optical shutter device 2, and a driver 32 for the image display device 1 and first and second optical shutter devices 2 and 3.

The image display device 1, the first optical shutter device 2, and the second optical shutter device 3 include an image display liquid crystal cell 4, a first shutter liquid crystal cell 13, and a second shutter liquid crystal cell 20, respectively. This apparatus includes a first polarizing plate 27 between the image display liquid crystal cell 4 and the first shutter liquid crystal cell 13. The apparatus includes a second polarizing plate 28 between the image display liquid crystal cell 4 and the second shutter liquid crystal cell 20. The apparatus includes a third polarizing plate 29 on the opposite side of the first shutter liquid crystal cell 13 to the surface light source 31. The apparatus includes a fourth polarizing plate 30 on the opposite side of the second shutter liquid crystal cell 20 to the side facing the image display liquid crystal cell 4, i.e., on the viewing side of display.

The image display liquid crystal cell 4 comprises a pair of transparent substrates 5 and 6 joined to each other through a frame-like seal member 7 surrounding the screen area 1a and a liquid crystal layer 8 sealed between the substrates 5 and 6. The apparatus includes first light-shielding films 9a and second light-shielding films 9b that are formed alternately on one of the opposing inner surfaces of the transparent substrates 5 and 6, e.g., the inner surface of the substrate 5 on the opposite side to the viewing side, at predetermined intervals in the horizontal direction of the screen. Each first light-shielding film 9a is formed in the shape of a long strip parallel to the vertical direction of the screen. Each second light-shielding film 9b is formed in the shape of a long strip having a width larger than that of the first light-shielding film 9a. The apparatus includes transparent electrodes 10 and 11 on the inner surfaces of the substrates 5 and 6 for the respective areas between the first and second light-shielding films 9a and 9b. The transparent electrodes 10 and 11 form pixels Da (see FIG. 3) to control the transmission of light in accordance with image data upon writing of the image data.

This apparatus has the pixel electrodes 11 on one substrate of the image display liquid crystal cell 4, e.g., the inner surface of the substrate 6 on the viewing side. The pixel electrodes 11 are arrayed in a line in each of areas corresponding to the areas between the first and second light-shielding films 9a and 9b in the vertical direction of the screen. The apparatus has the counterelectrode 10 in the form of a single film that is formed on the other substrate, i.e., the inner surface of the substrate 5 on the opposite side to the viewing side, so as to cover the entire screen area 1a. Although not shown in the accompanying drawings, the inner surface of the substrate 6 on the viewing side has TFTs (Thin-Film Transistors) respectively connecting to the pixel electrodes 11, scanning lines to supply gate signals to the TFTs, and signal lines to supply image data signals to the TFTs, thereby forming an active matrix type liquid crystal cell.

The inner surface of the substrate 5 on the opposite side to the viewing side has color filters 12R, 12G, and 12B of three colors, i.e., red, green, and blue, alternately formed side by side in the horizontal direction of the screen. Each of the color filters 12R, 12G, and 12B is formed for a corresponding pair of pixel electrode arrays, of the respective pixel electrode arrays each obtained by arraying the pixel electrodes 11 in a line in the vertical direction of the screen, which are adjacent to each other through the first light-shielding film 9a with the smaller width. The counterelectrode 10 covers the first and second light-shielding films 9a and 9b and the color filters 12R, 12G, and 12B.

The inner surfaces of the substrates 5 and 6 respectively are provided with aligning films (not shown) covering the electrodes 10 and 11. The liquid crystal molecules of the liquid crystal layer 8 sandwiched between these aligning films are aligned in an initial alignment state corresponding to the directions of aligning treatment (rubbing) applied to the respective aligning films.

The image display device 1 comprises the image display liquid crystal cell 4 and the first and second polarizing plates 27 and 28 sandwiching the image display liquid crystal cell 4.

As shown in FIG. 4, in the image display device 1, an aligning treatment direction 5a on the inner surface of the substrate 5 of the image display liquid crystal cell 4 is set to a direction rotated clockwise through 45° with respect to an abscissa x of the screen, and an aligning treatment direction 6a on the inner surface of the substrate 6 is set to a direction rotated counterclockwise through 45° with respect to the abscissa x. This arrangement forms a TN display device with the liquid crystal molecules of the liquid crystal layer 8, i.e., the twist direction of molecular orientation, being twisted and aligned between the substrates 5 and 6 at a twist angle of almost 90°, as indicated by the broken line arrow in FIG. 4. The first and second polarizing plates 27 and 28 are arranged such that transmission axes 27a and 28a are respectively rotated clockwise and counterclockwise through 45° with respect to the abscissa x of the screen so as to intersect at a right angle. That is, in this image display device, the aligning treatment direction 5a on the inner surface of the substrate 5 is almost parallel to the transmission axis 27a of the first polarizing plate 27, and the transmission axis 28a of the second polarizing plate 28 is perpendicular to the transmission axis 27a of the first polarizing plate 27.

The image display device 1 controls the transmission of light through each pixel Da of pixel arrays formed one by one in areas, of the screen area 1a, other than the portions corresponding to the first and second light-shielding films 9a and 9b, thereby displaying an image using these pixels. This device controls the transmittances of the pixels Da by applying write voltages corresponding to image data to between the electrodes 10 and 11 corresponding to the respective pixels Da.

As shown in FIGS. 2 and 3, the image display device 1 has first non-display portions B1 (first light-shielding portions) and second non-display portions B2 (second light-shielding portions) alternately arranged in the predetermined screen area 1a in the horizontal direction of the screen. The first non-display portions B1 are almost black and defined in the form of strips parallel to the vertical direction of the screen by the first light-shielding films 9a with the smaller width. The second non-display portions B2 are almost black and defined in the form of strips having a width larger than that of the first non-display portion B1 by the second light-shielding films 9b with the larger width. Image display portions D1 and D2 are formed in the respective areas between the first and second non-display portions B1 and B2 in the screen area 1a. The pixels Da, which control the transmission of light in accordance with image data upon writing of the image data, are arrayed in a line in each of the image display portions D1 and D2. That is, in the image display device 1, pixel pairs comprise the pixels D1, arrayed in a line on one side of the first light-shielding portions extending in the vertical direction of the image display device 1, as viewed from the viewing side, and the pixels D2, arrayed in a line on the other side in the vertical direction. These pixel pairs are arrayed in the horizontal direction of the image display device 1.

The image display portions D1 and D2, each comprising one pixel array of the image display device 1, have a width (the width of one pixel Da) Daw, which is approximately 45 µm. A width B1w of the first non-display portion B1 is set to almost the same as the width Daw of the image display portions D1 and D2, i.e., approximately 45 µm. A width B2w of the second non-display portion B2 is set to a value in the range of two to five times the width B1w of the first non-display portion B1, e.g., approximately 195 µm.

The first shutter liquid crystal cell 13 comprises a pair of transparent substrates 14 and 15 joined to each other through a frame-like seal member 16 surrounding a rectangular area corresponding to the screen area 1a of the image display device 1 and a liquid crystal layer 17 sealed between the substrates 14 and 15. The opposing inner surfaces of the substrates 14 and 15 respectively have transparent electrodes 18 and 19 in the form of long strips for forming shutter portions S1 (see FIG. 3). These transparent electrodes are formed in areas other than the areas corresponding to the first non-display portions B1 with the smaller width of the image display device 1, as viewed from the predetermined first viewing direction of the image display device 1. Each shutter portion S1 controls transmission/shielding of light in accordance with selective supply of a first shutter opening signal and a shutter closing signal.

Note that in the three-dimensional image display apparatus of this embodiment, the first shutter liquid crystal cell 13 is designed with front surface direction (normal direction) of the image display device 1 being the first viewing direction of a three-dimensional image. The first viewing direction is almost the same direction as the normal direction passing through the central portion the screen of the image display device 1 in the horizontal direction.

The inner surfaces of the substrates 14 and 15 respectively are provided with aligning films covering the electrodes 18 and 19. The liquid crystal molecules of the liquid crystal layer 17 are aligned in an initial alignment state corresponding to the directions of aligning treatment (rubbing) applied to the aligning films on the inner surfaces of the substrates 14 and 15.

The first optical shutter device 2 comprises the first shutter liquid crystal cell 13 and the third and first polarizing plates 29 and 27 sandwiching the first shutter liquid crystal cell 13.

As shown in FIG. 4, the first optical shutter device 2 is a non-twisted homogeneous alignment type liquid crystal device in which aligning treatment directions 14a and 15a on the inner surfaces of the substrates 14 and 15 of the first shutter liquid crystal cell 13 are set to be parallel to the abscissa x of the screen and to opposite directions, and the liquid crystal molecules of the liquid crystal layer 17 are homogeneously aligned by aligning their long axes with the aligning treatment directions 14a and 15a. A value $\Delta nd$ (the product of double refraction birefringence anisotropy $\Delta n$ of the liquid crystal and a liquid crystal layer thickness d) of the homogeneous alignment type liquid crystal device is set to approximately 275 nm. The third polarizing plate 29 is placed such that a transmission axis 29a is almost perpendicular to the transmission axis 27a of the first polarizing plate 27 to set the first optical shutter device 2 in the normally white mode.

The first optical shutter device 2 transmits light striking areas other than the shutter portions S1 comprising areas where the electrodes 18 and 19 face each other (areas corresponding to the first non-display portions B1 of the image display device 1, as viewed from the first viewing direction). In addition, the first optical shutter device 2 controls the transmission/shielding of light with respect to the shutter portions S1 in accordance with selective application of shutter opening voltages corresponding to the first shutter opening signals and shutter closing voltages corresponding to the first shutter closing signals between the transparent electrodes 18 and 19 in the shutter portions S1.

Note that a shutter opening voltage corresponding to the first shutter opening signal is almost 0V or a voltage close to it, which aligns the liquid crystal molecules in an initial homogeneous alignment state, and a shutter closing voltage corresponding to the first shutter closing signal is a voltage that raises/aligns the liquid crystal molecules at a raise angle with respect to the surfaces of the substrates 14 and 15 at which the light transmittance of the shutter portions S1 increases most.

In the first optical shutter device 2, light-transmitting portions W1 that steadily transmit light correspond to the areas corresponding to the first non-display portions B1 with the smaller width of the image display device 1, of an area 2a corresponding to the screen area 1a of the image display device 1, as viewed from the first viewing direction, and the shutter portions S1, which control the transmission/shielding of light in accordance with selective supply of the first shutter opening signals and the shutter closing signals (selective application of the first shutter opening voltages and the shutter closing voltages to between the electrodes 18 and 19), correspond to the remaining areas. Note that referring to FIG. 3, the shutter portions S1 are indicated by the broken line hatchings to allow easy discrimination between the light-transmitting portions W1 and the shutter portions S1.

A width W1w of the light-transmitting portion W1 of the first optical shutter device 2 is set to almost the same as a width D1aw of the first non-display portion B1 of the image display device 1 and the image display portions D1 and D2, i.e., approximately 45 μm, and a width S1w of the shutter portion S1 is set to approximately 285 μm.

The second shutter liquid crystal cell 20 comprises a pair of transparent substrates 21 and 22 joined to each other through a frame-like seal member 23 surrounding a rectangular area corresponding the screen area 1a of the image display device 1, and a liquid crystal layer 24 sealed between the substrates 21 and 22. The opposing inner surfaces of the substrates 11 and 22 have transparent electrodes 25 and 26 in the form of long strips for forming second shutter portions S2 (see FIG. 3). These electrodes are formed in areas other than the areas corresponding to the middle portions of the second non-display portions B2 with the larger width of the image display device 1, as viewed from the first viewing direction of the image display device 1. This arrangement controls the transmission/shielding of light with respect to the second shutter portions S2 in accordance with selective supply of second shutter opening signals and shutter closing signals.

The inner surfaces of the substrates 21 and 22 are provided with aligning films (not shown) covering the electrodes 25 and 26. The liquid crystal molecules of the liquid crystal layer 24 are aligned in an initial alignment state corresponding to the directions of aligning treatment (rubbing) applied to the respective aligning films on the inner surfaces of the substrates 21 and 22.

The second optical shutter device 3 comprises the second shutter liquid crystal cell 20 and the second and fourth polarizing plates 28 and 30 sandwiching the second shutter liquid crystal cell 20.

As shown in FIG. 4, the second optical shutter device 3 is a non-twisted homogeneous alignment type liquid crystal device in which aligning treatment directions 21a and 22a on the inner surfaces of the substrates 21 and 22 of the second shutter liquid crystal cell 20 are set to be parallel to the abscissa x of the screen and to opposite directions, and the liquid crystal molecules of the liquid crystal layer 24 are homogeneously aligned by aligning their long axes with the aligning treatment directions 21a and 22a. A value $\Delta nd$ of the homogeneous alignment type liquid crystal device is set to almost the same as that of the first optical shutter device 2, i.e., approximately 275 nm. The fourth polarizing plate 30 is placed such that a transmission axis 30a is almost perpendicular to the transmission axis 28a of the second polarizing plate 28 to set the second optical shutter device 3 in the normally white mode.

The second optical shutter device 3 transmits light striking areas other than the second shutter portions S2 comprising areas where the electrodes 25 and 26 face each other (areas corresponding to the middle portions of the second non-display portions B2 of the image display device 1, as viewed from the first viewing direction). In addition, the second optical shutter device 3 controls the transmission/shielding of light with respect to the shutter portions S2 in accordance with selective application of shutter opening voltages corresponding to the second shutter opening signals and shutter closing voltages corresponding to the second shutter closing signals between the electrodes 25 and 26 in the second shutter portions S2.

Note that a shutter opening voltage corresponding to the second shutter opening signal is almost 0V or a voltage close to it, which aligns the liquid crystal molecules in an initial homogeneous alignment state, and a shutter closing voltage corresponding to the second shutter closing signal is a voltage that raises/aligns the liquid crystal molecules at a raise angle with respect to the surfaces of the substrates 14 and 15 at which the light transmittance of the shutter portions S2 increases most.

That is, as shown in FIGS. 2 and 3, in the second optical shutter device 3, light-transmitting portions W2 that steadily transmit light are formed in the areas corresponding to the middle portions of the second non-display portions 32 with the larger width of the image display device 1, of an area 3*a* corresponding to the screen area 1*a* of the image display device 1, as viewed from the first viewing direction, and the second shutter portions S2, which control the transmission/shielding of light in accordance with selective supply of the second shutter opening signals and the shutter closing signals (selective application of the second shutter opening voltages and the shutter closing voltages to between the electrodes 25 and 26), are formed in the remaining areas. Note that referring to FIG. 3, the shutter portions S2 are indicated by the broken line hatchings to allow easy discrimination between the light-transmitting portions W2 and the shutter portions S2.

A width W2*w* of the light-transmitting portion W2 of the second optical shutter device 3 is set to almost the same as the width Daw of the first non-display portion B1 of the image display device 1 and the image display portions D1 and D2, i.e., approximately 45 μm, and a width S2*w* of the second shutter portion S2 is set to approximately 615 μm.

The first optical shutter device 2 is placed on the opposite side of the image display device 1 to the viewing side so as to set the distance between the central position of the thickness of the liquid crystal layer 8 of the image display device 1 and the central position of the thickness of the liquid crystal layer 17 of the first optical shutter device 2 to approximately 510 μm. The second optical shutter device 3 is placed on the viewing side of the image display device 1 so as to set the distance between the central position of the thickness of the liquid crystal layer 8 of the image display device 1 and the central position of the thickness of the liquid crystal layer 24 of the second optical shutter device 3 to approximately 600 μm.

The surface light source 31 applies, to the first optical shutter device 2, illumination light with an intensity distribution spreading horizontally centered on the normal direction of the image display device. Although simplified in the accompanying drawings, the surface light source 31 comprises, for example, a light guide plate obtained by forming a light incident end face on one end face of a plate-like transparent member, forming an irradiate surface for light entering from the incident end face on one of the two plate surfaces of the transparent member, and forming a reflecting surface to reflect light entering from the incident end face toward the irradiate surface on the other plate surface, light-emitting devices comprising LEDs (Light-Emitting Diodes) facing the incident end face of the light guide plate, and a light diffusing plate placed on the irradiate surface side of the light guide plate.

The driver 32 for the image display device 1 and the first and second optical shutter devices 2 and 3 includes a driving circuit that selectively performs the first display drive mode of allowing viewing of a three-dimensional image from only the first viewing direction and the second display drive mode of allowing viewing of a three-dimensional image from two directions that tilt to the left and right with respect to the normal of the image display device 1. In the first display drive mode, this apparatus writes the left-eye image data of the left- and right-eye image data for the display of a three-dimensional image in the pixels Da of the image display portion D1, of the adjacent image display portions D1 and D2 located across the first non-display portion B1 with the smaller width of the image display device 1, which is located on the left side of the first non-display portion B1, as viewed from the first viewing direction, and writes the right-eye image data in the pixels Da of the image display portion D2 on the right side of the first non-display portion B1. The apparatus also supplies the first shutter closing signal for shielding light to each shutter portion S1 of the first optical shutter device 2, and supplies the second shutter opening signal for transmitting light to each second shutter portion S2 of the second optical shutter device 3. In the second display drive mode, the apparatus writes the left-eye image data in the pixels Da of the image display portion D2, of the adjacent image display portions D1 and D2 located across the second non-display portion B2 with the larger width of the image display device 1, which is located on the left side of the second non-display portion B2, as viewed from the first viewing direction, and writes the right-eye image data in the pixels Da of the image display portion D1 on the right side of the second non-display portion B2. That is, in the second display drive mode, the apparatus writes the left-eye image data in the pixels Da of the image display portion D2, of the adjacent image display portions D1 and D2 located across the first non-display portion B1 of the image display device 1, which is located on the right side of the first non-display portion B1, as viewed from the first viewing direction, and writes the right-eye image data in the pixels Da of the image display portion D1 on the left side of the first non-display portion B1. The apparatus also supplies the first shutter opening signal for transmitting light to each shutter portion S1 of the first optical shutter device 2, and supplies the second shutter closing signal for shielding light to each second shutter portion S2 of the second optical shutter device 3.

Note that this three-dimensional image display apparatus is to be mounted in an electronic device such as a game machine. The electronic device includes selection keys corresponding to unidirectional viewing and bidirectional viewing. When unidirectional viewing is selected, the driver 32 performs the first display drive mode. When bidirectional viewing is selected, the driver 32 performs the second display drive mode.

This three-dimensional image display apparatus displays a stereoscopic three-dimensional image by applying illumination light from the surface light source 31 upon selection of either the first display drive mode or the second display drive mode. Selection of the first display drive mode cases the apparatus to display a three-dimensional image in the first viewing direction. Selection of the second display drive mode cases the apparatus to simultaneously display three-dimensional images in the second and third viewing directions different from the first viewing direction, which tilt to the left and right with respect to the first viewing direction.

Figure 5:
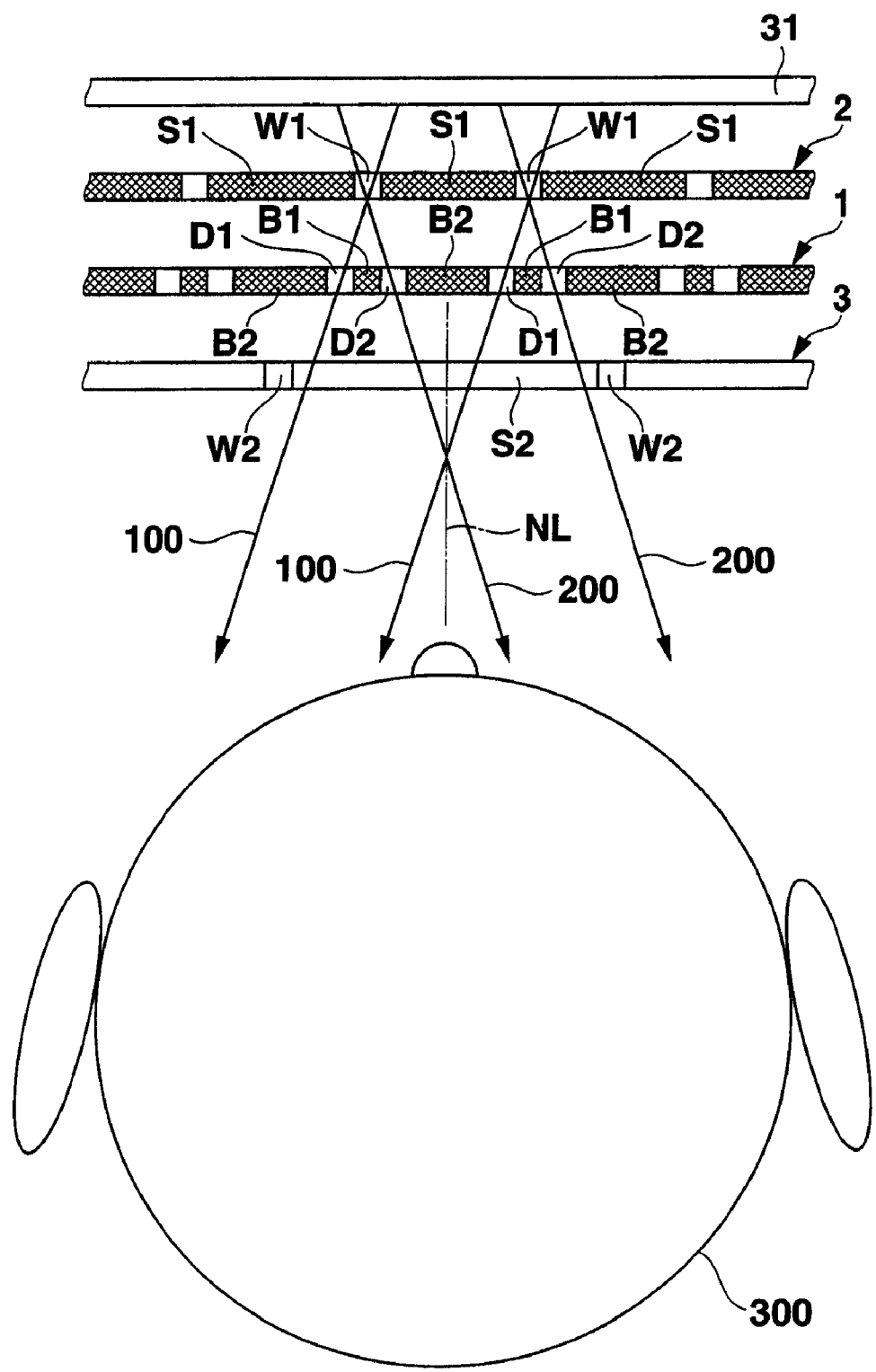
FIG. 5 is a view showing irradiated light beams when the first display drive mode of the display apparatus is selected.

FIG. 5 shows light beams irradiated when the first display drive mode in the three-dimensional image display apparatus is selected. In this mode, each first shutter portion S1 of the first optical shutter device 2 is set in the closed state wherein it shields light, and each second shutter portion S2 of the second optical shutter device 3 is set in the open state wherein it transmits light. As a consequence, the illumination light emitted from the surface light source 31 passes through the light-transmitting portions W1 of the first optical shutter device 2 and strikes the image display device 1. Light passing through the image display portion D1, of the adjacent image display portions D1 and S2 located across the first non-display portion E1 with the smaller width of the image display device 1, which is located on the left side of the first non-display portion B1, as viewed from the first viewing direction passes through the light-transmitting portions W2 and second shutter portions S2 of the second optical shutter device 3, and is irradiated to the direction of the left eye of the viewer that tilts to the left with respect to a central line (a normal passing through the central portion of the screen of the image display device 1 in the horizontal direction in this embodiment) NL in the first viewing direction (an arrow 100). Light passing through the image display portion D2 on the right side of the first non-display portion B1 passes through the light-transmitting portions W2 and second shutter portions S2 of the second optical shutter device 3, and is irradiated to the direction of the left eye of the viewer that tilts to the right with respect to the central line NL in the first viewing direction (an arrow 200).

In the first display drive mode, the apparatus writes left-eye image data in each pixel Da of the image display portion D1 on the left side of the first non-display portion B1 of the image display device 1, and writes right-eye image data in each pixel Da of the image display portion D2 on the right side. As a consequence, the display apparatus irradiates left-eye image light in a direction tilting to the left with respect to the central line NL in the first viewing direction, and irradiates right-eye image light in a direction tilting to the right. This allows a viewer 300 who views display from the first viewing direction to view left-eye image light by the left eye and right-eye image light by the right eye, thereby performing three-dimensional image display.

FIG. 5 greatly exaggerates the irradiate angles of left-eye image light and right-eye image light with respect to the central line NL in the first viewing direction. In this embodiment, as described above, the width Daw of the image display portions D1 and D2 of the image display device 1 and a width B1$wa$ of the first non-display portion B1 are set to approximately 45 μm, the width B2$w$ of the second non-display portion B2 is set to approximately 195 μm, the width W1$w$ of the light-transmitting portion W1 of the first optical shutter device 2 is set to approximately 45 μm, the width S1$w$ of the shutter portion S1 is set to approximately 285 μm, and the distance between the centers of the thicknesses of the liquid crystal layers 8 and 17 of the image display device 1 and first optical shutter device 2 is set to approximately 510 μm. Consequently, the irradiate angle of each of left-eye image light and right-eye image light (the direction of the peak of irradiated light intensity) is approximately 5°. In addition, the proper viewing distance of a three-dimensional image from the first viewing direction is approximately 40 cm.

Figure 6:
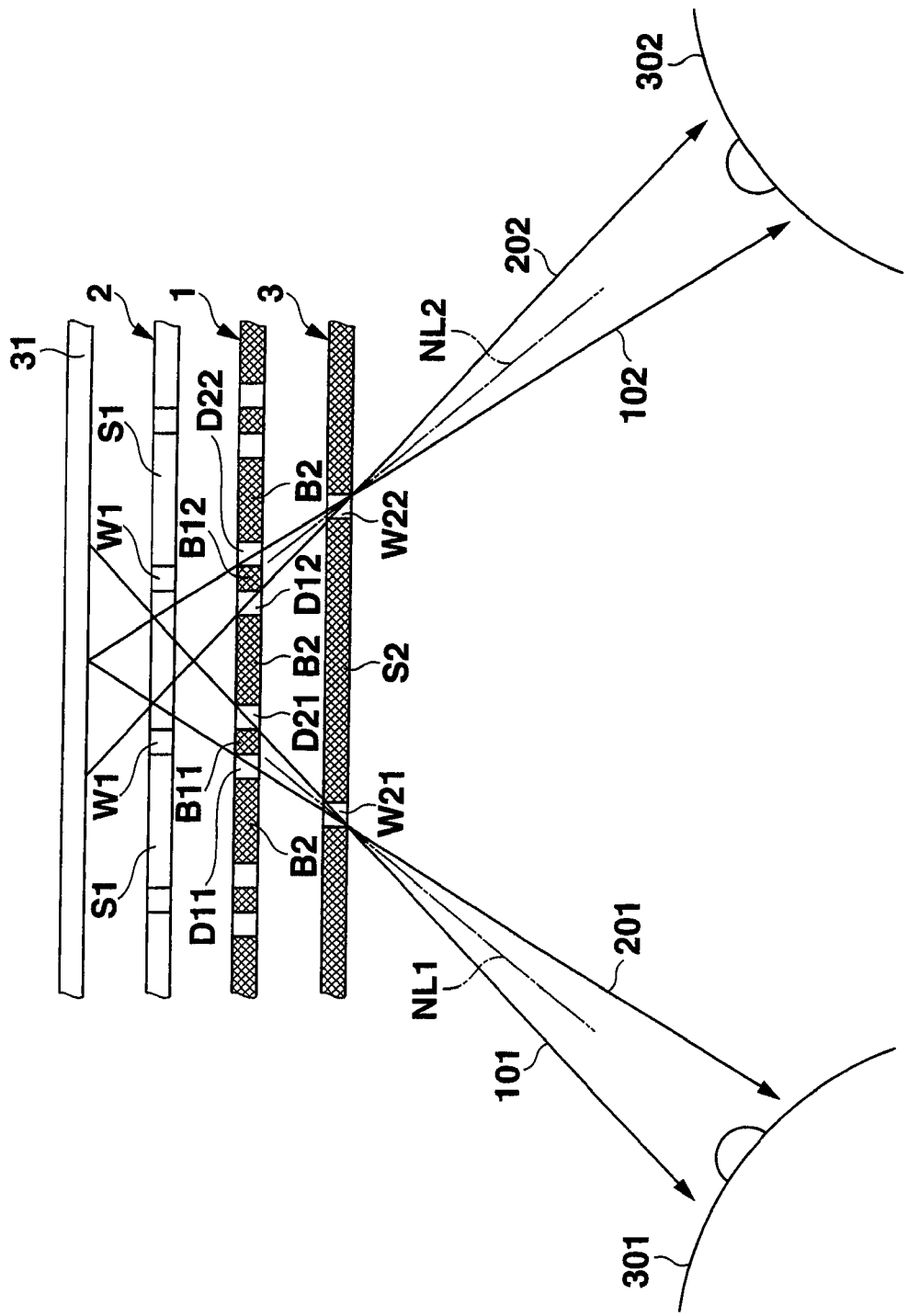
FIG. 6 is a view showing irradiated light beams when the second display drive mode of the display apparatus is selected.

FIG. 6 shows light beams irradiated when the second display drive mode in the three-dimensional image display apparatus is selected. In this mode, each first shutter portion S1 of the first optical shutter device 2 is set in the open state wherein it transmits light, and each second shutter portion S2 of the second optical shutter device 3 is set in the closed state wherein it shields light. Illumination light emitted from the surface light source 31 passes through the light-transmitting portions W1 and shutter portions S1 of the first optical shutter device 2 and strikes the image display device 1, as indicated by the arrows (101, 102, 201, 202) in FIG. 6. Of the light that has passed through the image display portions D1 and D2 of the image display device 1, light propagating to each light-transmitting portion W2 of the second optical shutter device 3 is irradiated to the viewing side.

Consequently, light passing through an image display portion D21, of each of alternative non-display portions B11, of first non-display portions B11 and B12 of the image display device 1, which is located on the right side as viewed from the normal direction of the display surface of the display apparatus, passes through a light-transmitting portion W21 located on the left side of the first non-display portion B11 as viewed from the normal direction of the second optical shutter device 3, and is irradiated in the direction indicated by an arrow 101 that tilts to the left from the normal. In addition, light passing through the image display portion D11 on the left side of each of alternate first non-display portions B11 passes through the light-transmitting portion W21 located on the left side of the first non-display portion B11 as viewed from the normal direction of the second optical shutter device 3, and is irradiated in the direction indicated by an arrow 201 that tilts to the left from the normal at a tilt angle smaller than that of the arrow 101. That is, the display apparatus irradiates light in the directions indicated by the arrows 101 and 201 that laterally intersect at a predetermined angle centered on a second viewing direction NL1 that passes through the center of the first non-display portion B11 of the image display device 1 and the center of the light-transmitting portion W21 on the left side of the first non-display portion 311 as viewed from the normal direction of the second optical shutter device 3 and tilts to the left. Consequently, the left eye of a first viewer 301 that is located at the second viewing direction NL1 views the light indicated by the arrow 101, and the right eye of the first viewer 301 views the light indicated by the arrow 201.

Light passing through the image display portion D22 on the right side of each of alternate first non-display portions B12 of the first non-display portions B11 and B12 of the image display device 1 passes through a light-transmitting portion W22 located on the right side of the first non-display portion B12 as viewed from the normal direction of the second optical shutter device 3, and is irradiated to the direction indicated by an arrow 102 that tilts to the right from the normal. In addition, light passing through an image display portion D12 on the left side of each of the other alternate first non-display portions B12 passes through the light-transmitting portion W22 located on the right side of the first non-display portion B12 as viewed from the normal direction of the second optical shutter device 3, and is irradiated to the direction indicated by an arrow 202 that tilts to the right from the normal at a tilt angle larger than that of the arrow 102. That is, the display apparatus irradiates light in the directions indicated by the arrows 102 and 202 that laterally intersect at a predetermined angle centered on a third viewing direction NL2 that passes through the center of the first non-display portion B12 of the image display device 1 and the center of the light-transmitting portion W22 on the right side of the first non-display portion B12 as viewed from the normal direction of the second optical shutter device 3 and tilts to the right. Consequently, the left eye of a second viewer 302 that is located at the third viewing direction NL2 views the light indicated by the arrow 102, and the right eye of the second viewer 302 views the light indicated by the arrow 202.

In the second display drive mode, the apparatus writes left-eye image data in each pixel Da of the image display portion D21 on the left side of the second non-display portion B2 of the image display device 1, and writes right-eye image data in each pixel Da of the image display portion D12 on the right side. Consequently, light beams irradiated in directions tilting to the left with respect to the second viewing direction NL1 and the third viewing direction NL2 are left-eye image light beams, and light beams irradiated in directions tilting to the right with respect to the second viewing direction NL1 and the third viewing direction NL2 are right-eye image light beams. Thus, the apparatus causes the two viewers 301 and 302 who view display from two directions tilting to the left and right with respect to the normal direction, i.e., the second viewing direction NL1 and the third viewing direction NL2, to view left-eye image light beams by the left eyes and right-eye image light beams by the right eyes, thereby performing three-dimensional image display.

FIG. 6 greatly exaggerates the tilt angles of the second viewing direction NL1 and third viewing direction NL2 with respect to the normal direction. The width Daw of the image display portions D11, D12, D21, and D22 of the image display device 1 and the width B1w of the first non-display portions B11 and B12 are set to approximately 45 μm, and the width S2w of the second non-display portion B2 is set to approximately 195 μm. In this embodiment, the width W2w of the light-transmitting portions W21 and W22 of the second optical shutter device 3 is set to approximately 45 μm, the width S2w of the shutter portion S2 is set to approximately 285 μm, and the distance between the centers of the thicknesses of the liquid crystal layers 8 and 24 of the image display device 1 and second optical shutter device 3 is set to approximately 600 μm. For this reason, the tilt angles of the second viewing direction NL1 and third viewing direction NL2 with respect to the first viewing direction are approximately 15°, and the irradiate angle of the left- and right-eye image light beams with respect to the second viewing direction NL1 and the irradiate angle (the direction of the peak of irradiated light intensity) of the left- and right-eye image light beams with respect to the third viewing direction NL2 are approximately 4°. In addition, the proper viewing distance of a three-dimensional image from the second viewing direction NL1 and the third viewing direction NL2 is approximately 50 cm.

As described above, the three-dimensional image display apparatus comprises the image display device 1, first optical shutter device 2, second optical shutter device 3, surface light source 31, and driver 32. The image display device 1 is obtained by alternately forming, in the predetermined screen area 1a in the horizontal direction of the screen, the first non-display portions 31 that are almost black and in the form of strips parallel to the vertical direction of the screen and the second non-display portions B2 that are almost black and in the form of strips with a width larger than that of the first non-display portions B1, and forming, in the respective areas between the first and second non-display portions B1 and B2 in the screen area 1a, the image display portions D1 and D2 in which the pixels Da for controlling the transmission of light in accordance with image data upon writing of the image data are arrayed. The first optical shutter device 2 placed on the opposite side of the image display device 1 to the viewing side is obtained by forming the light-transmitting portions W1, which steadily transmit light, in the respective areas corresponding to the first non-display portions B1 of the image display device 1, as viewed from the predetermined viewing direction of the image display device 1, and the shutter portions S1, which control the transmission/shielding of light in accordance with the selective supply of first shutter opening signals and shutter closing signals, in the respective other areas. The second optical shutter device 3 placed on the viewing side of the image display device 1 is obtained by forming the light-transmitting portions W2, which steadily transmit light, in the respective areas corresponding to the middle portions of the second non-display portions B2 of the image display device 1, as viewed from the viewing direction, and forming the shutter portions S2, which control the transmission/shielding of light in accordance with selective supply of second shutter opening signals and shutter closing signals, in the respective other areas. The surface light source 31 is placed on the opposite side of the first optical shutter device 2 to the side facing the image display device 1, and applies illumination light toward the first optical shutter device 2. The driver 32 is used for the image display device 1 and the first and second optical shutter devices 2 and 3. This apparatus displays a three-dimensional image in the first viewing direction in the first display drive mode as follows. The apparatus writes left-eye image data in each pixel Da of the image display portion D1, of the adjacent image display portions D1 and D2 located across the first non-display portion B1 of the image display device 1, which is located on the left side of the first non-display portion B1 as viewed from the viewing direction, and writes right-eye image data in each pixel Da of the image display portion D2 on the right side of the first non-display portion B1. The apparatus also supplies the first shutter closing signal for shielding light to each shutter portion S1 of the first optical shutter device 2 located on the opposite side of the image display device 1 to the viewing side, and supplies the second shutter opening signal for transmitting light to each second shutter portion S2 of the second optical shutter device 3 located on the viewing side of the image display device 1. The apparatus simultaneously displays three-dimensional images in two directions tilting to the left and right with respect to the first viewing direction in the second display drive mode as follows. The apparatus writes the left-eye image data in each pixel of the image display portion D2, of the adjacent image display portions D1 and D2 located across the second non-display portion B2 of the image display device 1, which is located on the left side of the second non-display portion B2 as viewed from the first viewing direction, and writes the right-eye image data in each pixel of the image display portion D1 on the right side of the second non-display portion B2. The apparatus also supplies the first shutter opening signal for transmitting light to each shutter portion S1 of the first optical shutter device 2, and supplies the second shutter closing signal for shielding light to each shutter portion S2 of the second optical shutter device 3. This display apparatus allows the user to view three-dimensional images not only from the first viewing direction but also from two directions tilting to the left and right with respect to the first viewing direction.

In this three-dimensional image display apparatus of this embodiment, the first viewing direction is set to almost the same direction as the normal direction passing through the central portion of the screen of the image display device in the horizontal direction, so that the apparatus allows the user to view a three-dimensional image displayed in the first display drive mode from the normal direction passing through the central portion of the screen of the image display device 1 and view a three-dimensional image displayed in the second display drive mode from two directions tilting to the left and right with respect to the normal direction.

In this three-dimensional image display apparatus, the image display portions D1 and D2 of the first and second non-display portions B1 and B2 of the image display device 1 comprise the areas in each of which the pixels Da are arrayed in a line in the vertical direction of the screen, the first non-display portion B1 has almost the same width as that of the image display portions D1 and D2, and the second non-display portion B2 has a width in the range of two to five times the width of the first non-display portion B1, so that the apparatus allows the user to view high-quality three-dimensional images without any unevenness not only from the first viewing direction but also from the second and third viewing directions tilting to the left and right with respect to the first viewing direction.

That is, the left- and right-eye images viewed by the left and right eyes of the viewer 300 at the time of selection of the first display drive mode shown in FIG. 5 are respectively the image formed by arranging left-eye images, each corresponding to one pixel array and displayed by the respective pixels Da of a corresponding one of the image display portions D1 on the left side of the first non-display portion B1 of the image display device 1, at intervals corresponding to the pitch of the image display portions D1, and the image formed by arranging right-eye images, each corresponding to one pixel array and displayed by the respective pixels Da of a corresponding one of the image display portions D2 on the right side of the first non-display portion B1, at intervals corresponding to the pitch of the image display portions D2. As described above, when the width Daw of the image display portions D1 and D2 and the width B1w of the first non-display portion B1 are set to approximately 45 μm and the width B2w of the second non-display portion B2 is set to approximately 195 μm, the pitch of the image display portions D1 and the pitch of the image display portions D2 are approximately 330 μm. This makes the eyes of the viewer 300 view the left- and right-eye images without seeing almost any intervals between the images of the respective arrays.

In addition, the left- and right-eye images viewed by the left and right eyes of the viewers 301 and 302 at the time of selection of the second display drive mode shown in FIG. 6 are respectively the image formed by arranging left-eye images, each corresponding to one pixel array and displayed by the respective pixels Da of a corresponding one of the image display portions D2 on the left side of the second non-display portion B2 of the image display device 1, at intervals corresponding to the pitch of the alternate image display portions D2, and the image formed by arranging right-eye images, each corresponding to one pixel array and displayed by the respective pixels Da of a corresponding one of the image display portions D1 on the right side of the second non-display portion B2, at intervals corresponding to the pitch of the alternate image display portions D1. When the width Daw of the image display portions D1 and D2, the width B1w of the first non-display portion B1, and the width B2w of the second non-display portion B2 are set to the above values, the pitch of the image display portions D1 and the pitch of the image display portions D2 are approximately 660 μm. This allows the eyes of the viewers 301 and 302 to view the left- and right-eye images without any noticeable intervals between the images of the respective arrays.

So, this apparatus allows the user to view high-quality three-dimensional images without any unevenness not only from the first viewing direction but also from two directions tilting to the left and right with respect to the first viewing direction.

As described above, an image display apparatus according to the present invention comprises an image display device including pixels to display a right-eye image and a left-eye image for displaying a three-dimensional image, the pixels including pixel pairs that have pixels arranged to be adjacent across first light-shielding portions, the pixel pairs being arrayed across second light-shielding portions, a first optical shutter device that is placed on a rear side of the image display device, which is opposite to a viewing side thereof, and includes first light-transmitting portions that are placed at positions corresponding to the first light-shielding portions of the image display device, transmit light toward the pixel pairs of the image display device, and cause image light beams passing through the pixels of the pixel pairs to strike a right eye and a left eye of a viewer located in a predetermined first viewing direction, and first shutter portions to control transmission/shielding of light with respect to an area other than the first light-transmitting portions, and a second optical shutter device that is placed on a front side of the viewing side of the image display device, and includes second light-transmitting portions that are placed at positions corresponding to the second light-shielding portions of the image display device, and cause image light beams respectively passing through the pixels of the pixel pairs that are adjacent to each other across the second light-shielding portions to strike right eyes and left eyes of viewers located in a predetermined second viewing direction and a third viewing direction different from the second viewing direction, and second shutter portions to control transmission/shielding of light with respect to an area other than the second light-transmitting portions.

In the image display apparatus, preferably, the pixels include pixel arrays pairs each having a pair of pixel arrays that are arranged across the first light-shielding portions, each pixel arrays including pixels arrayed in a vertical direction of the image display device, as viewed from the viewing side, and the pixel array pairs are arrayed across the second light-shield portions in a horizontal direction of the image display device. In this image display device, desirably, the pixel pairs include pixels arrayed in a line in the vertical direction on one side of the first light-shielding portions extending in the vertical direction and pixels arrayed in a line in the vertical direction on the other side. Desirably, the first light-shielding portions have substantially the same width as that of the pixels.

In the image display apparatus, preferably, the first light-transmitting portions have substantially the same width as that of the first light-shielding portions of the image display device. Preferably, the second light-transmitting portions have substantially the same width as that of the pixels of the image display device. Preferably, the second light-transmitting portions are formed at positions corresponding to a substantially middle of a width of the second light-shielding portions of the image display device.

Preferably, the image display apparatus further comprises a controller that causes one set of pixels of the pixel pairs of the image display device and the other set of pixels to display the right-eye image and the left-eye image, respectively, and alternately controls the first shutter portions of the first optical shutter device and the second shutter portions of the second optical shutter device in a state of shielding transmitted light in accordance with display of the images. Preferably, the image display apparatus further comprises a surface light source that is located on the rear side of the image display device, which is opposite to the viewing side, and irradiates illumination light to the image display device.

An image display apparatus according to the present invention comprises an image display device including pixels to display a right-eye image and a left-eye image for displaying a three-dimensional image, the pixels including pixel pairs that have pixels arranged to be adjacent across first light-shielding portions, the pixel pairs being arrayed across second light-shielding portions, a surface light source that is placed on a rear side of the image display device, which is opposite to a viewing side, and irradiates illumination light to the image display device, a first optical shutter device that is placed between the image display device and the surface light source, and includes first light-transmitting portions that are placed at positions corresponding to the first light-shielding portions of the image display device, irradiate illumination light from the surface light source toward the pixel pairs of the image display device, and cause image light beams passing through the respective pixels of the pixel pairs to strike a right eye and a left eye of a viewer located in a predetermined first viewing direction, and first shutter portions to control transmission/shielding of light with respect to an area other than the first light-transmitting portions, and a second optical shutter that is placed on a front side of the image display device, which is opposite to the surface light source, and includes second light-transmitting portions that are placed at positions corresponding to the second light-shielding portions of the image display device, and cause image light beams of illumination light from the surface light source that have passed through the respective pixels of the pixel pairs adjacent to the second light-shielding portions of the image display device to strike right eyes and left eyes of viewers located in a predetermined second viewing direction and a third viewing direction different from the second viewing direction, and second shutter portions to control transmission/shielding of light with respect to an area other than the second light-transmitting portions.

In the image display apparatus, preferably, the pixels include pixel arrays pairs each having a pair of pixel arrays that are arranged across the first light-shielding portions extending in a vertical direction of the image display device, as viewed from the viewing side, each pixel arrays including pixels arrayed in a line, and the pixel array pairs are arrayed in a horizontal direction of the image display device. Preferably, the first light-shielding portions have substantially the same width as that of the pixels, and the first light-transmitting portions have substantially the same width as that of the pixels.

In the image display apparatus, preferably, the second light-transmitting portions have substantially the same width as that of the pixels of the image display device, and are formed at positions corresponding to a substantially middle of the width of the second light-shielding portions of the image display device. Preferably, the image display apparatus further comprises a controller that alternately controls the first shutter portions of the first optical shutter device and the second shutter portions of the second optical shutter device in a state of shielding transmitted light in accordance with display of the images corresponding to the right-eye image and the left-eye image respectively using pixels of the pixel pairs of the image display device. Preferably, the controller controls the first shutter portions of the first optical shutter device in a light shielding state and the second shutter portions of the second optical shutter device in a light transmission state when causing pixels on a right side of the pixel pairs of the image display device to display the right-eye image, and causing pixels on a left side of the pixel pairs to display the left-eye image. Preferably, the controller controls the first shutter portions of the first optical shutter device in a light transmission state and the second shutter portions of the second optical shutter device in a light shielding according to the present invention comprises an image display device that includes first non-display portions that are substantially black and in the form of strips parallel to a vertical direction of a screen, second non-display portions that are substantially black and in the form of strips with a width larger than that of the first non-display portions, the first and second non-display portions being alternately formed at predetermined intervals in a predetermined screen area in a horizontal direction of the screen, and image display portions including pixels for controlling transmission of light in accordance with image data upon writing of the image data, the pixels being arrayed in the respective areas between the first and second non-display portions in the screen area, a first optical shutter device that is placed on an opposite side to a viewing side of the image display device, and includes first light-transmitting portions that steadily transmit light and are formed in areas corresponding to the first non-display portions of the image display device, as viewed from a predetermined viewing direction of the image display device, and shutter portions that control transmission/shielding of light in accordance with selective supply of first shutter opening signals and shutter closing signals and are formed in other areas, a second optical shutter device that is placed on the viewing side of the image display device, and includes second light-transmitting portions that steadily transmit light and are formed in areas corresponding to middle portions of the second non-display portions of the image display device, as viewed from the viewing direction, and shutter portions that control transmission/shielding of light in accordance with selective supply of second shutter opening signals and shutter closing signals and are formed in other areas, a surface light source that is placed on an opposite side of the first optical shutter device to a side facing the image display device, and applies illumination light toward the first optical shutter device, and a driver that selectively performs a first display drive mode of writing left-eye image data of left-eye image data and right-eye image data for display of a three-dimensional image in pixels of image display portions, of the adjacent image display portions located across the first non-display portion of the image display device, that are located on a left side of the first non-display portions, as viewed from the viewing direction, writing right-eye image data in pixels of the image display portions that are located on a right side of the first non-display portions, supplying the first shutter closing signal for shielding light to the shutter portions of the first optical shutter device, and supplying the second shutter opening signal for transmitting light to the shutter portions of the second optical shutter device, and a second display drive mode of writing the left-eye image data in the pixels of image display portions, of the adjacent image display portions located across the second non-display portion of the image display device, that are located on the left side of the second non-display portions, as viewed from the viewing direction, writing the right-eye image data in the pixels of the image display portions that are located on the right side of the second non-display portions, supplying the first shutter opening signal for transmitting light to the shutter portions of the first optical shutter device, and supplying the second shutter closing signal for shielding light to the shutter portions of the second optical shutter device.

In the three-dimensional image display apparatus, preferably, the viewing direction is substantially the same as a normal direction passing through a central portion of the screen of the image display device in the horizontal direction. Preferably, the image display portions between the first non-display portions and the second non-display portions of the image display device comprise areas in which pixels are arrayed in a line in the vertical direction of the screen, the first non-display portions have substantially the same width as that of the image display portions, and the second non-display portions have a width in a range of two to five times the width of the first non-display portions.

Note that the three-dimensional image display apparatus of the above embodiment comprises the image display device 1 comprising a TN display device. However, the image display device 1 is not limited to a TN display device and may be a display device of another type. In addition, the first and second optical shutter devices 2 and 3 are not limited to non-twisted homogeneous alignment type liquid crystal devices and may be display devices of another type.

In the above embodiment, the first and second polarizing plates 27 and 28 are arranged so as to make the transmission axes 27a and 28a perpendicular to each other. However, these plates may be arranged so as to make the transmission axes 27a and 28a parallel to each other.

Additional advantages and modifications will readily occur to those skilled in the art. Therefore, the invention in its broader aspects is not limited to the specific details and representative embodiments shown and described herein.

Accordingly, various modifications may be made without departing from the spirit or scope of the general inventive concept as defined by the appended claims and their equivalents.

What is claimed is:

1. A display apparatus comprising:
    a display device including a first image pixel, a second image pixel, a third image pixel, and a fourth image pixel arrayed in a predetermined direction in order;
    a first shutter element, arranged to face the display device, to switch between light shielding patterns in accordance with a display mode;
    a second shutter element, arranged so that the display device is interposed between the first shutter element and the second shutter element itself, to switch between light shielding patterns in accordance with the display mode;
    a light source arranged so that the first shutter element is interposed between the display device and the light source itself; and
    a driving circuit to control the light shielding patterns by the first shutter element and the light shielding patterns by the second shutter element so that, in a first display mode, a first user who observes the display device from a direction normal thereto is allowed to visually recognize light from the light source that has passed through the four image pixels individually, and, in a second display mode, that a second user who observes the display device from a direction inclined by a predetermined angle with respect to the normal direction to the display device towards a first direction such as to be along the predetermined direction is allowed to visually recognize only light from the light source that has passed through the first image pixel and the second image pixel individually in the light that has passed through the four image pixels individually.

2. The display apparatus according to claim 1, wherein the driving circuit controls the light shielding patterns by the first shutter element and the light shielding patterns by the second shutter element so that, in the second display mode, a third user who observes the display device from a direction inclined by a predetermined angle with respect to the normal direction to the display device towards an opposite direction to the first direction such as to be along the predetermined direction is allowed to visually recognize only light from the light source that has passed through the third image pixel and the fourth image pixel individually in the light that has passed through the four image pixels individually.

3. The display apparatus according to claim 1, wherein the driving circuit controls the light shielding patterns by the first shutter element and the light shielding patterns by the second shutter element so that, in the first display mode, the first user is allowed to visually recognize only light from the light source that has passed through the first image pixel and the second image pixel individually in the light that has passed through the four image pixels individually with only a left eye.

4. The display apparatus according to claim 3, wherein the driving circuit controls the light shielding patterns by the first shutter element and the light shielding patterns by the second shutter element so that, in the first display mode, the first user is allowed to visually recognize only light from the light source that has passed through the second image pixel and the fourth image pixel individually in the light that has passed through the four image pixels individually with only a right eye.

5. The display apparatus according to claim 1, wherein the driving circuit controls the light shielding patterns by the first shutter element and the light shielding patterns by the second shutter element so that, in the second display mode, the second user is allowed to visually recognize only light from the light source that has passed through the first image pixel in the light that has passed through the first image pixel and the second image pixel individually with only a right eye.

6. The display apparatus according to claim 5, wherein the driving circuit controls the light shielding patterns by the first shutter element and the light shielding patterns by the second shutter element so that, in the second display mode, the second user is allowed to visually recognize only light from the light source that has passed through the second image pixel in the light that has passed through the first image pixel and the second image pixel individually with only a left eye.

7. The display apparatus according to claim 2, wherein the driving circuit controls the light shielding patterns by the first shutter element and the light shielding patterns by the second shutter element so that, in the second display mode, the third user is allowed to visually recognize only light from the light source that has passed through the third image pixel in the light that has passed through the third image pixel and the fourth image pixel individually with only a left eye.

8. The display apparatus according to claim 7, wherein the driving circuit controls the light shielding patterns by the first shutter element and the light shielding patterns by the second shutter element so that, in the second display mode, the third user is allowed to visually recognize only light from the light source that has passed through the fourth image pixel in the light that has passed through the third image pixel and the fourth image pixel individually with only a right eye.

9. The display apparatus according to claim 2, wherein the display device includes:
    a first light shielding portion having a predetermined width and formed between the second image pixel and the third image pixel;
    a second light shielding portion having a width smaller than that of the first light shielding portion and formed between the first image pixel and the second image pixel; and
    a third light shielding portion having a same width as that of the second light shielding portion and formed between the third image pixel and the fourth image pixel.

10. The display apparatus according to claim 9, wherein the driving circuit controls the light shielding patterns by the first shutter element so that an area in the first shutter element that overlaps with the first light shielding portion on the normal becomes a light shielding area in the first display mode and becomes a light transmitting area in the second display mode.

11. The display apparatus according to claim 10, wherein the driving circuit controls the light shielding patterns by the second shutter element so that an area in the second shutter element that overlaps with the first light shielding portion on the normal becomes a light shielding area in the first display mode and becomes a light transmitting area in the second display mode.

12. The display apparatus according to claim 11, wherein the driving circuit controls the light shielding patterns by the first shutter element so that an area in the first shutter element that overlaps with the second light shielding portion on the normal becomes a light shielding area in the first display mode and becomes a light transmitting area in the second display mode.

13. The display apparatus according to claim 12, wherein the driving circuit controls the light shielding patterns by the first shutter element so that an area in the first shutter element that overlaps with the second image pixel on the normal becomes a light shielding area in the first display mode and becomes a light transmitting area in the second display mode.

14. The display apparatus according to claim 13, wherein the driving circuit controls the light shielding patterns by the first shutter element so that an area in the first shutter element that overlaps with the third image pixel on the normal becomes a light shielding area in the first display mode and becomes a light transmitting area in the second display mode.

15. The display apparatus according to claim 14, wherein the driving circuit controls the light shielding patterns by the second shutter element so that an area in the second shutter element that overlaps with the second image pixel on the normal becomes a light transmitting area in the first display mode and becomes a light shielding area in the second display mode.

16. The display apparatus according to claim 15, wherein the driving circuit controls the light shielding patterns by the second shutter element so that an area in the second shutter element that overlaps with the third image pixel on the normal becomes a light transmitting area in the first display mode and becomes a light shielding area in the second display mode.

17. A display apparatus comprising:
a display device including a first image pixel, a second image pixel, a third image pixel, and a fourth image pixel arrayed in a predetermined direction in order;
a first shutter element, arranged to face the display device, to switch between light shielding patterns in accordance with a display mode;
a second shutter element, arranged so that the display device is interposed between the first shutter element and the second shutter element itself, to switch between light shielding patterns in accordance with the display mode; and
a light source arranged so that the first shutter element is interposed between the display device and the light source itself;
the display device including:
a first light shielding portion having a predetermined width and formed between the second image pixel and the third image pixel;
a second light shielding portion having a width smaller than that of the first light shielding portion and formed between the first image pixel and the second image pixel; and
a third light shielding portion having a same width as that of the second light shielding portion and formed between the third image pixel and the fourth image pixel, wherein an area in the first shutter element that overlaps with the first light shielding portion on a normal direction to the display device is set in a light shielding state in a first display mode and in a light transmitting state in a second display mode, and wherein an area in the second shutter element that overlaps with the first light shielding portion on the normal direction is set in a light transmitting state in the first display mode and in a light shielding state in the second display mode.

18. The display apparatus according to claim 17, wherein an area in the first shutter element that overlaps with the second image pixel on the normal direction and an area in the first shutter element that overlaps with the third image pixel on the normal direction are set in a light shielding state in the first display mode and in a light transmitting state in the second display mode, and an area in the second shutter element that overlaps with the second image pixel on the normal direction and an area in the second shutter element that overlaps with the third image pixel on the normal direction are set in a light transmitting state in the first display mode and in a light shielding state in the second display mode.

19. The display apparatus according to claim 18, wherein an area of the first shutter element that overlaps with the first image pixel on the normal direction and an area of the first shutter element that overlaps with the fourth image pixel on the normal direction are set in a light shielding state in the first display mode and in a light transmitting state in the second display mode, and an area of the second shutter element that overlaps with the first image pixel on the normal direction and an area of the second shutter element that overlaps with the fourth image pixel on the normal direction are set in a light transmitting state in the first display mode and in a light shielding state in the second display mode.

20. The display apparatus according to claim 19, wherein at least part of an area of the first shutter element that overlaps with the second light shielding portion on the normal direction and at least part of an area of the first shutter element that overlaps with the third light shielding portion on the normal direction are set in a light transmitting state in the first display mode and the second display mode, and an area of the second shutter element that overlaps with the second light shielding portion on the normal direction and an area of the second shutter element that overlaps with the third light shielding portion on the normal direction are set in a light shielding state in the first display mode and the second display mode.

* * * * *